Figure 1:
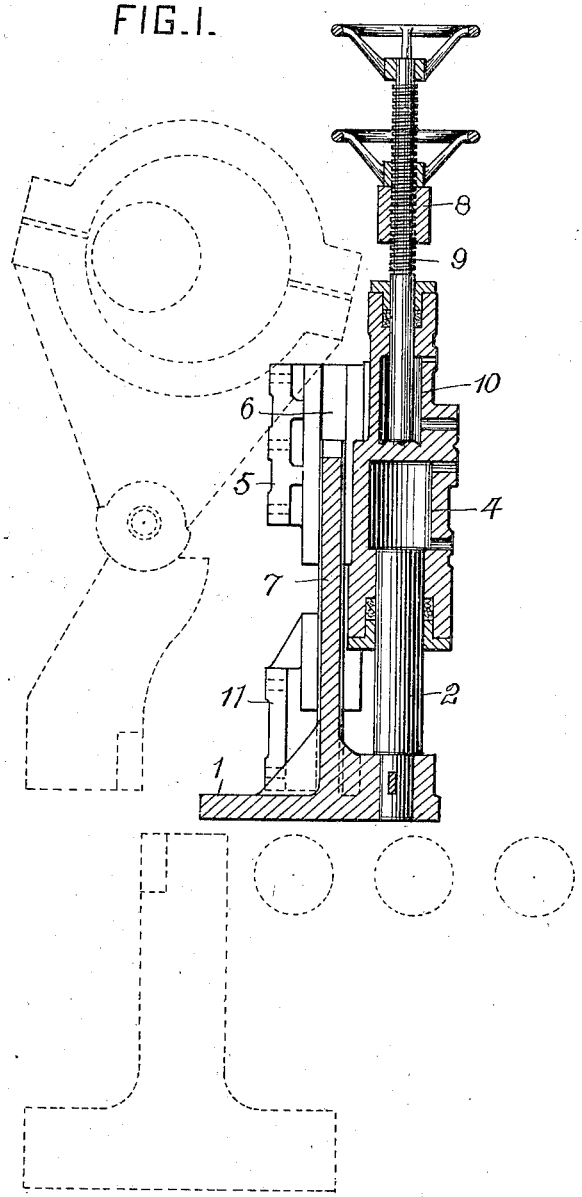

No. 726,296. PATENTED APR. 28, 1903.
S. V. HUBER.
SHEARING MECHANISM.
APPLICATION FILED JULY 31, 1902.
NO MODEL. 2 SHEETS—SHEET 1.

WITNESSES: INVENTOR

No. 726,296. PATENTED APR. 28, 1903.
S. V. HUBER.
SHEARING MECHANISM.
APPLICATION FILED JULY 31, 1902.
NO MODEL. 2 SHEETS—SHEET 2.
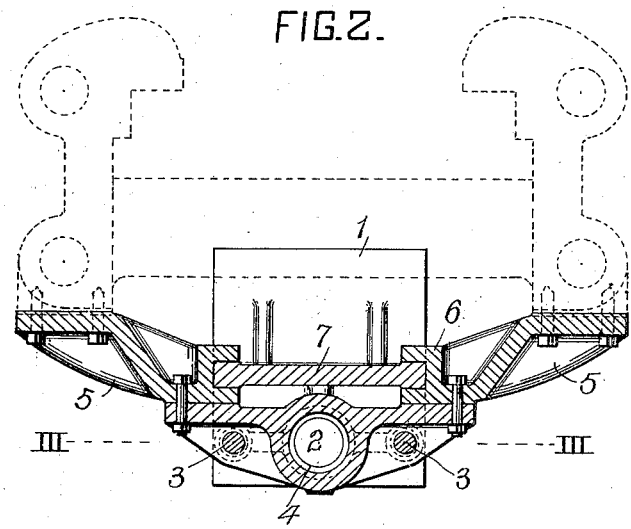
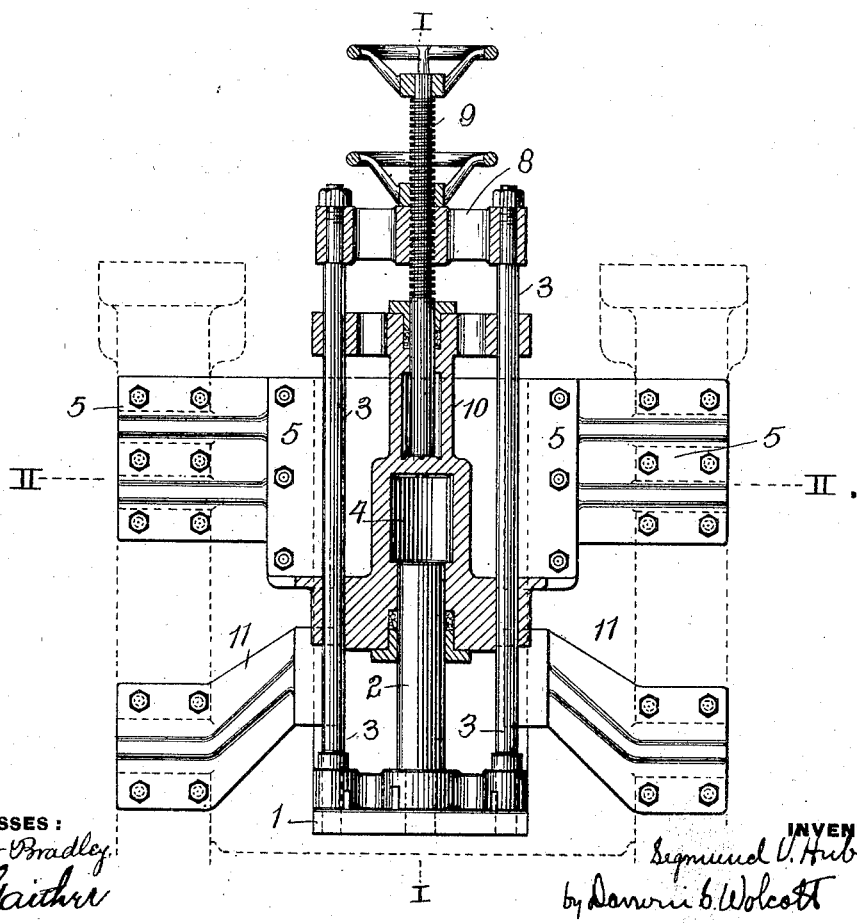

UNITED STATES PATENT OFFICE.

SIGMUND V. HUBER, OF PITTSBURG, PENNSYLVANIA.

SHEARING MECHANISM.

SPECIFICATION forming part of Letters Patent No. 726,296, dated April 28, 1903.

Application filed July 31, 1902. Serial No. 117,805. (No model.)

*To all whom it may concern:*

Be it known that I, SIGMUND V. HUBER, a citizen of the United States, residing at Pittsburg, in the county of Allegheny and State of Pennsylvania, have invented or discovered certain new and useful Improvements in Shearing Mechanism, of which improvements the following is a specification.

The invention described herein relates to certain improvements in mechanism for preventing the tipping up of the rear portion of billet-plate, &c., during the operation of a shear. One of the means heretofore employed was so constructed that the holding mechanism operated as a clamping-jaw, forcing the article down upon the feed or supporting table, thereby necessitating the lifting of the jaw after every cut to permit of the feed of the article. Another form of mechanism consists of a bar or plate which could be so adjusted relative to the feed or supporting table as to permit of the movement of the articles of uniform dimensions and shape to the shears and yet prevent any material kicking up of the rear portion of the article during the shearing operation; but in case the billet, &c., was bent or had a split end the holding-head had to be raised for the passage of this abnormal portion and then readjusted.

The object of the present invention is to present any desired resistance as against any material upward movement of the article without any clamping or gripping action on the article.

It is a further object of the invention to provide for the adjustment of the holding plate or head of the mechanism relative to the feed or supporting table of the shear and for quick and easy shifting of the head from and to its adjusted position.

The invention is hereinafter more fully described and claimed.

In the accompanying drawings, forming a part of this specification, Figure 1 is a sectional elevation of my improvement on a plane indicated by the line I I, Fig. 3, portions of the shear mechanism being shown in outline. Fig. 2 is a sectional plan on a plane indicated by the line II II, Fig. 3; and Fig. 3 is a sectional elevation on a plane indicated by the line III III, Fig. 2.

In the practice of my invention the head or plate 1 is connected to the lower ends of the ram 2 and the lifting-rods 3. The ram 2 extends up into the holding-cylinder 4, which is preferably formed integral with wings 5, bolted, as shown in Figs. 2 and 3, to the housing of the shear. Guide-grooves 6 are formed in the wings 5 for the reception of the guide-plate 7, formed integral with or suitably secured to the head 1. The lifting-rods 3 extend up to a cross-head 8, through which passes a screw 9. This screw extends down into the lifting-cylinder 10, and its lower end is constructed to form the ram for said cylinder, which is also by preference formed integral with the holding-cylinder 4 and the supporting-wings 5. While not necessary it is preferred to employ auxiliary guide-wings 11, which are secured to the shear-housing and engage the guide-plate 7.

In operation the screw 9, the lower end of which normally bears against the lower end of the lifting-cylinder, is turned to raise or lower the head 1. When this head has been shifted to the desired position relative to the feed or supporting table, (indicated by feed-rollers,) pressure is admitted into the holding-cylinder to prevent kicking up of the article. It frequently happens that the end or other portion of a billet is too thick to pass between the head and feed or supporting table. In such case fluid under pressure is admitted into the lifting-cylinder, thereby forcing up the screw 9, and with it the cross-head 8, rods 3, and head 1, the pressure in the holding-cylinder being released. As soon as the thick portion of the article has passed beyond the head pressure in the lifting-cylinder is released and that in the holding-cylinder restored, thereby forcing the head 1 down to normal position or until the end of screw 9 bears on its support—*i. e.*, the end of the cylinder 10.

It is characteristic of my improvement that the holding-head may be easily adjusted to any position relative to the feed or supporting table of the shear mechanism and can be quickly shifted from and to such position when required.

It is further characteristic of my improvement that any desired resistance to any material upward movement of the article is provided and that without exerting clamping or gripping action on the article. Hence the invention is not limited as regards the broad terms of the claims to the construction shown and described, as various changes or modifications will readily suggest themselves to those skilled in the art without departing from the spirit of the invention.

I claim herein as my invention—

1. A shear mechanism having in combination, a holding-head, a fluid-pressure cylinder and piston for holding said head as against upward movement, a stop for limiting the downward movement of the head, and a fluid-pressure cylinder and piston for raising said head, substantially as set forth.

2. A shear mechanism having in combination, a holding-head, a fluid-pressure mechanism for holding said head as against upward movement, an adjustable stop for limiting the downward movement of the head and a fluid-pressure mechanism for raising said head, substantially as set forth.

3. A shear mechanism having in combination, a holding-head, a fluid-pressure cylinder and piston for holding said head as against upward movement, a fluid-pressure cylinder, a piston therefor, a cross-head adjustably connected to said piston, and connections from the cross-head to the holding-head, substantially as set forth.

In testimony whereof I have hereunto set my hand.

SIGMUND V. HUBER.

Witnesses:
DARWIN S. WOLCOTT,
F. E. GAITHER.